US012725830B2

(12) United States Patent
Hu et al.

(10) Patent No.: US 12,725,830 B2
(45) Date of Patent: Sep. 1, 2026

(54) SOLID-STATE BATTERY, BATTERY MODULE, BATTERY PACK, AND APPARATUS ASSOCIATED THEREWITH

(71) Applicant: JIANGSU CONTEMPORARY AMPEREX TECHNOLOGY LIMITED, Changzhou (CN)

(72) Inventors: Bobing Hu, Changzhou (CN); Chengyong Liu, Changzhou (CN); Yongsheng Guo, Changzhou (CN); Qian Li, Changzhou (CN); Jiawei Fu, Changzhou (CN); Meng Cheng, Changzhou (CN)

(73) Assignee: Jiangsu Contemporary Amperex Technology Limited, Changzhou (CN)

( * ) Notice: Subject to any disclaimer, the term of this patent is extended or adjusted under 35 U.S.C. 154(b) by 1040 days.

(21) Appl. No.: 17/866,402

(22) Filed: Jul. 15, 2022

(65) Prior Publication Data

US 2022/0352550 A1 Nov. 3, 2022

Related U.S. Application Data

(63) Continuation of application No. PCT/CN2021/073763, filed on Jan. 26, 2021.

(30) Foreign Application Priority Data

Sep. 15, 2020 (CN) ......................... 202010966809.5

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01)

(58) Field of Classification Search
CPC ...................... H01M 10/0525; H01M 10/0565
See application file for complete search history.

(56) References Cited

FOREIGN PATENT DOCUMENTS

| | | | |
|---|---|---|---|
| CN | 105470564 A | 4/2016 | |
| CN | 106532109 A * | 3/2017 | ........ H01M 10/0525 |

(Continued)

OTHER PUBLICATIONS

Machine Translation of CN 110247112 A (Year: 2019).*

(Continued)

*Primary Examiner* — Sathavaram I Reddy
(74) *Attorney, Agent, or Firm* — K&L Gates LLP

(57) ABSTRACT

A solid-state battery, a battery module, a battery pack, and an apparatus associated therewith are provided. In some embodiments, the solid-state battery includes a solid-state electrolyte, where the solid-state electrolyte includes a sulfide electrolyte layer and at least one polymer electrolyte layer provided on a surface of the sulfide electrolyte layer, and the solid-state electrolyte satisfies the following condition: thickness of the sulfide electrolyte layer≥thickness of the polymer electrolyte layer on one side ≥84.2−80.2 w. The polymer electrolyte layer having an appropriate thickness in this disclosure can improve interfacial infiltration between the current sulfide electrolyte layer and an electrode without seriously reducing the overall energy density of the battery, thereby overcoming defects of sulfide electrolyte in disclosures in solid-state batteries to a large extent and improving cycling performance and safety performance of solid-state batteries.

15 Claims, 3 Drawing Sheets

(56) References Cited

FOREIGN PATENT DOCUMENTS

| | | | | | |
|---|---|---|---|---|---|
| CN | 108963334 | A | | 12/2018 | |
| CN | 109565078 | A | | 4/2019 | |
| CN | 109768318 | A | * | 5/2019 | ........ H01M 10/0585 |
| CN | 110034275 | A | | 7/2019 | |
| CN | 110247112 | A | | 9/2019 | |
| CN | 110400965 | A | | 11/2019 | |
| CN | 110943248 | A | | 3/2020 | |
| CN | 111933999 | A | | 11/2020 | |
| EP | 3457486 | A1 | | 3/2019 | |
| JP | 2010186682 | A | | 8/2010 | |
| KR | 20160013630 | A | * | 2/2016 | |
| WO | 02061872 | A1 | | 8/2002 | |

OTHER PUBLICATIONS

Machine Translation of CN 110400965 A (Year: 2019).*
Machine Translation of CN-106532109-A (Year: 2017).*
Machine Translation of CN-109768318-A (Year: 2019).*
Machine Translation of KR-20160013630-A (Year: 2016).*
International Search Report received in PCT Application PCT/CN2021/073763 on Jun. 18, 2021.
Written Opinion of the International Search Authority in PCT Application PCT/CN2021/073763 on Jun. 18, 2021.
The first Office Action issued in the Chinese corresponding application CN2020109668095.
The second Office Action issued in the Chinese corresponding application CN2020109668095.
The search report issued in the Chinese corresponding application CN2020109668095.
Weidong Zhou et al., "Double-Layer Polymer Electrolyte for High-Voltage All-Solid- State Rechargeable Batteries", Advanced Materials, Dec. 5, 2018.
The office action received in corresponding European application No. 21868029.6, mailed on Nov. 19, 2024.
The European search report received in the corresponding European Application 21868029.6, mailed on Nov. 6, 2024.

* cited by examiner

SOLID-STATE BATTERY, BATTERY MODULE, BATTERY PACK, AND APPARATUS ASSOCIATED THEREWITH

This application is a continuation of International Application PCT/CN2021/073763, filed Jan. 26, 2021, which claims priority to Chinese Patent Application No. 202010966809.5, filed with the China National Intellectual Property Administration on Sep. 15, 2020 and entitled "SOLID-STATE BATTERY, BATTERY MODULE, BATTERY PACK, AND APPARATUS ASSOCIATED THEREWITH", which is incorporated herein by reference in its entirety.

TECHNICAL FIELD

This disclosure relates to a solid-state battery, a battery module, a battery pack, and an apparatus associated therewith, and pertains to the technical field of batteries.

BACKGROUND

At present, liquid-state electrolytes used in commercial lithium-ion batteries often bring huge safety risks to existing energy storage products such as electric vehicles because they are prone to leakage and flammability. Especially with the explosive growth of the new energy industry in recent years, news about fire and explosion of batteries are continually heard, and thus consumers are having ever urgent demands for battery safety. Given that the characteristics of liquid-state electrolytes are difficult to change, the disclosure of solid-state electrolytes has become one of well-known solutions to safety problems of lithium batteries in the industry. This not only brings opportunities for the development of the solid-state battery industry, but also imposes a severe challenge to further improvement of safety performance of solid-state batteries with high energy density.

SUMMARY

In consideration of the differences in electrolyte materials, solid-state batteries can be categorized into three types: polymer, oxide, and sulfide, where the sulfide solid-state electrolyte has advantages of room temperature conductivity comparable to that of a liquid electrolyte and ease of processing. Due to the porous interior and rough surface of sulfide materials, they can reach a compact state only under extremely high preparation pressure (≥100 MPa) to reduce diffusion resistance for lithium ions in the electrolyte and inhibit dendrite growth at a negative-electrode interface. However, sulfide materials prepared at high pressure have high hardness, resulting in poor interfacial contact between the electrolyte and the positive electrode or the negative electrode, which increases interfacial resistance. In addition, as compacted sulfide has increased brittleness, changes in volume of positive-electrode and negative-electrode plates also cause the sulfide electrolyte to crack under pressure or subject it to quite many defects during charge-discharge cycling, which further increases the resistance and even brings about risks of short circuit.

Compared with inorganic materials, an organic polymer has some better mechanical properties (such as viscoelasticity and flexibility), and the inventors have further found that interfacial infiltration action between the sulfide electrolyte layer and the electrode can be effectively improved by adding one organic polymer electrolyte layer on both sides of the sulfide electrolyte layer. This not only reduces ion transmission resistance, but also causes lithium ions to be deposited more evenly at the negative-electrode interface, which also reduces risks of short circuit in the battery. In addition, thickness of the polymer electrolyte layer is also a critical factor affecting further improvement in safety performance and cycle life of the solid-state battery.

Therefore, this disclosure provides a solid-state battery. Thickness of a polymer electrolyte layer is defined to match a selected sulfide electrolyte layer in a solid-state electrolyte. Therefore, the polymer electrolyte layer can improve interfacial infiltration between the current sulfide electrolyte layer and an electrode without seriously reducing the overall energy density of the battery. This greatly overcomes defects of sulfide electrolyte in disclosures in solid-state batteries, and improves the cycling performance and safety performance of solid-state batteries.

This disclosure further provides a battery module. The battery module includes the foregoing solid-state battery, and thus the battery module has excellent cycling performance and safety performance.

The disclosure further provides a battery pack. The battery pack includes the foregoing solid-state battery, and thus the battery pack has excellent cycling performance and safety performance.

The disclosure further provides an apparatus. The apparatus includes the foregoing solid-state battery or battery module or battery pack, providing remarkable endurance with guaranteed safety performance, and offering excellent user experience.

This disclosure provides a solid-state battery. The solid-state battery includes a solid-state electrolyte, where the solid-state electrolyte includes a sulfide electrolyte layer and at least one polymer electrolyte layer provided on a surface of the sulfide electrolyte layer, and the solid-state electrolyte satisfies the following condition:

$$84.2-80.2\times w\leq Thk\leq h,$$

where h represents a thickness of the sulfide electrolyte layer in μm,

Thk represents a thickness of the polymer electrolyte layer on one side in μm, and w represents a packing fraction of the sulfide electrolyte layer.

In the solid-state battery of this disclosure, the solid-state electrolyte includes the sulfide electrolyte layer and the polymer electrolyte layer, where the thickness of the polymer electrolyte layer well matches that of the sulfide electrolyte layer, leading to excellent interfacial infiltration between the solid-state electrolyte including the sulfide electrolyte layer and the electrode. This decreases transmission resistance for lithium ions and increases transmission efficiency of lithium ions, thereby avoiding short circuit caused by growth of lithium dendrites without comprising much energy density of the solid-state battery. Therefore, the solid-state battery of this disclosure has overall satisfactory and balanced cycling performance and safety performance.

In the above solid-state battery, the thickness Thk of the polymer electrolyte layer on one side and the thickness h of the sulfide electrolyte layer satisfy Thk≤0.8×h, optionally, Thk≤0.5×h. When the thickness Thk of the polymer electrolyte layer on one side and the thickness h of the sulfide electrolyte layer are further within the above range, impact of the additional polymer electrolyte layer on the energy density of the solid-state battery can be avoided to the greatest extent.

In the above solid-state battery, the thickness h of the sulfide electrolyte layer is 5 μm-500 μm. Optionally, the thickness h is 1.0 μm-300 μm, 15 μm-250 μm, 20 μm-200 μm, or 25 μm-100 μm. Further optionally, the thickness h is 1.0 μm-50 μm. When the thickness h of the sulfide electrolyte layer is within the above range, energy density of the solid-state battery can be further improved.

In the above solid-state battery, a packing fraction w of the sulfide electrolyte layer is ≥0.70, optionally, 0.9≤w≤0.98. The solid-state battery of this disclosure has a solid-state electrolyte that includes a sulfide electrolyte layer that is more compact inside, such that defects of sulfide electrolyte such as porous interior and rough surface can be greatly overcome. This not only significantly reduces the transmission resistance for lithium ions in the sulfide electrolyte, but also avoids growth of lithium dendrites caused by uneven lithium deposition due to surface roughness, thereby improving the electrical performance and safety performance of the battery.

In the above solid-state battery, the sulfide electrolyte layer and the polymer electrolyte layer satisfy the following relationship:

$$1 \le R_P/R_S \le 10,$$

where $R_S$ represents a surface resistance of the sulfide electrolyte layer in $\Omega\cdot cm^2$, and $R_P$ represents a surface resistance of the polymer electrolyte layer in $\Omega\cdot cm^2$.

The above solid-state battery satisfies $1.1 \le R_P/R_S \le 8$, optionally, $1.2 \le R_P/R_S \le 5$. In this disclosure, when a surface resistance ratio of the polymer electrolyte layer to the sulfide electrolyte layer is within the above range, the solid-state battery can have further improved discharge capacity and energy density.

In the solid-state battery, lithium ion conductivity of the polymer electrolyte layer at 70° C. is 0.01 mS/cm-100 mS/cm, optionally, 0.1 mS/cm-10 mS/cm. When the lithium ion conductivity of the polymer electrolyte layer at 70° C. is within the above range, the solid-state battery can not only have good overall performance, but also better meet the demand for quick charging.

In the solid-state battery, the polymer electrolyte layer contains a polymer whose mass percentage in the polymer electrolyte layer is 30%-90%, optionally, 50%-80%. Generally, polymers have relatively low lithium ion conductivity. The polymer having a mass percentage in the polymer electrolyte layer within the above range not only helps ensure that the polymer electrolyte layer has high ion conductivity, but also enhances mechanical properties of the polymer electrolyte layer and improves interfacial infiltration. Therefore, the cycle life of the solid-state battery can be further increased.

The solid-state battery includes a positive electrode and a negative electrode, where the solid-state electrolyte is located between the positive electrode and the negative electrode, and the at least one polymer electrolyte layer is located on a surface of the sulfide electrolyte layer facing toward the negative electrode. In this disclosure, the polymer electrolyte layer is preferably provided on the surface of the sulfide electrolyte layer facing toward the negative electrode. This may be because lithium ions are easy to reduce at the negative electrode, and therefore the polymer electrolyte layer disposed between the sulfide electrolyte layer and the negative electrode can enhance interfacial contact between the sulfide electrolyte layer and the negative electrode, avoiding production of lithium dendrites or even short circuit of the battery caused by excessively large transmission resistance for lithium ions due to direct contact between the sulfide electrolyte layer with a rough surface and the negative electrode.

The solid-state battery includes a positive electrode and a negative electrode, where the solid-state electrolyte is located between the positive electrode and the negative electrode, and the at least one polymer electrolyte layer includes a first polymer electrolyte layer and a second polymer electrolyte layer, the first polymer electrolyte layer is located on a surface of the sulfide electrolyte layer facing toward the positive electrode, and the second polymer electrolyte layer is located on a surface of the sulfide electrolyte layer facing toward the negative electrode. In an example, a polymer contained in the first polymer electrolyte layer is selected from at least one of polyvinylidene fluoride, polytetrafluoroethylene, polysiloxane, polyacrylonitrile, and polymethyl methacrylate. A polymer contained in the second polymer electrolyte layer is selected from at least one of polyethylene, polyethylene oxide, polyvinyl chloride, polypropylene oxide, polyisobutylene, and polyphosphoester. Further optionally, an electrochemical oxidation peak of the polymer contained in the first polymer electrolyte layer is higher than 4.5V, and an electrochemical reduction peak of the polymer contained in the second polymer electrolyte layer is lower than 0V. In this disclosure, the first polymer electrolyte layer has excellent oxidation resistance and the second polymer electrolyte layer has excellent reduction resistance, ensuring that lithium ions normally intercalate/de-intercalate when the solid-state batteries are charged/discharged, thus avoiding oxidation and reduction of the polymers.

In the solid-state battery, a thickness of the first polymer electrolyte layer is denoted as Thk1, a thickness of the second polymer electrolyte layer is denoted as Thk2, and Thk2≥Thk1 is satisfied.

This disclosure further provides a battery module. The battery module includes the solid-state battery described in any one of the foregoing.

The battery module of this disclosure includes the above solid-state battery, and therefore can be widely used as an energy supply or energy storage unit to improve cycling performance and safety performance of electrochemical apparatuses.

This disclosure further provides a battery pack. The battery pack includes the solid-state battery or the battery module described in any one of the foregoing.

The battery pack of this disclosure includes the solid-state battery or the battery module, and therefore can be widely used as an energy supply or energy storage unit to improve cycling performance and safety performance of electrochemical apparatuses.

This disclosure further provides an apparatus, where a driving source or energy storage unit of the apparatus is the solid-state battery, or the battery module, or the battery pack described in any one of the foregoing.

The apparatus of this disclosure uses the foregoing solid-state battery or battery module or battery pack as its driving source or storage source, and therefore has excellent endurance, service life, and safety performance, bringing good user experience.

DETAILED DESCRIPTION OF EMBODIMENTS

Figure 1:
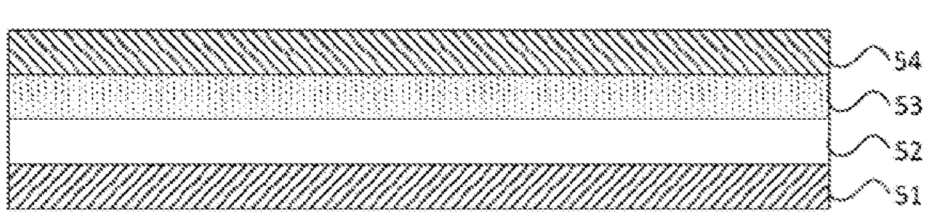
FIG. 1 is a schematic diagram of an internal structure of an example of a solid-state battery according to this disclosure.

To make the objectives, technical solutions, and advantages of this disclosure clearer, the following clearly and completely describes the technical solutions in the examples of this disclosure with reference to the accompanying drawings in the examples of this disclosure. Apparently, the described examples are some but not all of the examples of this disclosure. All other examples obtained by a person of ordinary skill in the art based on the examples of this disclosure without creative efforts shall fall within the protection scope of this disclosure.

A first aspect of this disclosure provides a solid-state battery 5, including a solid-state electrolyte, where the solid-state electrolyte includes a sulfide electrolyte layer 52 and at least one polymer electrolyte layer 53 provided on a surface of the sulfide electrolyte layer 52, and the solid-state electrolyte satisfies the following condition: $84.2-80.2\times w\leq Thk\leq h$, where h represents a thickness of the sulfide electrolyte layer 52 in μm, Thk represents a thickness of the polymer electrolyte layer 53 on one side in μm, and w represents a packing fraction of the sulfide electrolyte layer 52.

Typically, sulfide electrolytes are characterized by a porous interior and a rough surface. Therefore, the sulfide electrolyte needs to be pressed to become more compact before used as the solid-state electrolyte in the solid-state battery 5, thereby reducing diffusion resistance for lithium ions in the electrolyte. As preparation pressure increases, the porous interior and rough surface of the polymer electrolyte layer 53 are relieved, which, however, is accompanied by high hardness of the sulfide electrolyte layer 52, deteriorating the interfacial infiltration between the sulfide electrolyte layer and the electrode.

The solid-state electrolyte provided in accordance with this disclosure includes the sulfide electrolyte layer 52 with high hardness, which causes poor interfacial infiltration with the electrode, large transmission resistance for lithium ions, or even short circuit of batteries due to cracking of the solid-state electrolyte. To avoid these problems, the solid-state electrolyte further includes at least one polymer electrolyte layer 53 provided on a surface of the sulfide electrolyte layer 52. Flexibility of the polymer electrolyte layer 53 can improve interfacial infiltration between the sulfide electrolyte layer 52 and the electrode, thereby increasing lithium ion conductivity and reducing probability of cracking of the solid-state electrolyte.

Through further research, the applicant has found that the thickness of the polymer electrolyte layer 53 is crucial to the performance of the solid-state battery 5. An excessively thick polymer electrolyte layer 53 weakens the advantage of the sulfide electrolyte layer 52 (with high lithium ion conductivity) and seriously decreases the energy density of the battery, thereby affecting disclosure of batteries, whereas an excessively thin polymer electrolyte layer 53 is unable to improve interfacial contact between the sulfide electrolyte layer 52 and the electrode. Therefore, the solid-state electrolyte provided in this disclosure includes the sulfide electrolyte layer 52 and a polymer electrolyte layer 53 having an appropriate thickness, where the polymer electrolyte layer is determined based on the thickness and packing fraction of sulfide electrolyte, having a best match with the current sulfide electrolyte layer 52.

According to the above formula of this disclosure, the thickness of the polymer electrolyte layer 53 in the solid-state electrolyte of this disclosure is relevant to the thickness and packing fraction of the sulfide electrolyte layer 52. Therefore, the polymer electrolyte layer 53 is a more targeted remedy on the disadvantages of the current sulfide electrolyte layer 52, providing a better match. Specifically, the polymer electrolyte layer 53 having such appropriate thickness can allow excellent interfacial contact between the sulfide electrolyte layer 52 and the electrode and even ion flow at the interface, without weakening the advantage of high lithium ion conductivity of the sulfide electrolyte layer 52. This reduces ion transmission resistance and inhibits short circuit of the battery caused by cracking of the sulfide electrolyte layer 52 due to a local stress difference, without affecting the energy density of the solid-state battery 5, thereby ensuring that the solid-state battery 5 releases high electrical power. Therefore, the solid-state electrolyte satisfying the above condition allows the solid-state battery 5 of this disclosure to deliver excellent cycling performance and safety performance without negative impact on the energy density, so that the solid-state battery 5 achieves a balance among capacity, cycling performance and safety performance.

Furthermore, in order to avoid to the greatest extent impact on the energy density of the solid-state battery 5 by the additional polymer electrolyte layer 53, the thickness of the polymer electrolyte layer 53 on one side may be $Thk\leq 0.8\times h$, optionally, $Thk\leq 0.5\times h$.

In the solid-state battery 5 of this disclosure, the sulfide electrolyte layer with a thickness h of 5 μm-500 μm may be selected. Optionally, the thickness h is 1.0 μm-300 μm, 15 μm-250 μm, 20 μm-200 μm, or 25 μm-100 μm. In order to increase the energy density of the solid-state battery 5 as much as possible, the thickness h of the sulfide electrolyte layer 53 may be controlled within 1.0 μm-50 μm. In addition, sulfide in the sulfide electrolyte layer 52 may be selected from at least one of $Li_3PS_4$, $Li_6PS_5Cl$, $Li_{10}GeP_2S_{12}$, and $Li_7P_3S_{11}$.

As mentioned above, although transmission resistance for lithium ions in the sulfide electrolyte is reduced by pressing the sulfide electrolyte, the hardness of the sulfide electrolyte layer 52 increases with the pressing, causing degradation of interfacial contact between the sulfide electrolyte and the electrode. In addition, it is difficult to control the thickness of the polymer electrolyte layer 53 intended for relieving the degradation of interfacial contact, which in turn causes a significant decrease in the energy density of the battery. Therefore, at present, preparation pressure on the sulfide electrolyte layer is generally low in the art, so that problems of the sulfide electrolyte such as porous interior and rough surface cannot be effectively solved. However, in this disclosure, the polymer electrolyte layer 53 has an appropriate thickness, which has no negative impact on the energy density of the battery. In addition, the solid-state electrolyte of the solid-state battery 5 provided in this disclosure includes a more compact sulfide electrolyte layer 52, especially when the packing fraction w of the sulfide electrolyte layer 52 is ≥0.70, especially between 0.9 and 0.98, defects of the sulfide electrolyte such porous interior and rough surface can be overcome to the greatest extent. Therefore, this disclosure not only significantly reduces the transmission resistance for lithium ions in the sulfide electrolyte, but also avoids the growth of lithium dendrites caused by uneven lithium deposition due to surface roughness, thereby improving the electrical performance and safety performance of the solid-state battery 5.

Furthermore, in the solid-state battery 5 provided in this disclosure, the sulfide electrolyte layer 52 and the polymer electrolyte layer 53 in the solid-state electrolyte satisfy the following relationship:

$$1 \le R_P/R_S \le 10,$$

where $R_S$ represents a surface resistance of the sulfide electrolyte layer 52 in $\Omega \cdot cm^2$, and $R_P$ represents a surface resistance of the polymer electrolyte layer 53 in $\Omega \cdot cm^2$.

On the basis that the above requirement for the thickness of the polymer electrolyte layer 53 is satisfied, some embodiments further define the surface resistance ratio of the polymer electrolyte layer 53 to the sulfide electrolyte layer 52, thereby further improving the discharge capacity and energy density of the solid-state battery 5. In the formula, $R_P$ specifically refers to surface resistance of the polymer electrolyte layer 53 on one side.

In one embodiment, the surface resistance is mainly related to selected material and layer thickness. The polymer electrolyte layer 53 is taken as an example. Its appropriate thickness may be further defined by selecting polymer materials and/or within the previously defined thickness range of the polymer electrolyte layer 53, so as to meet the above requirement for surface resistance.

A smaller surface resistance of the polymer electrolyte layer 53 or a larger the surface resistance of the sulfide electrolyte layer 52 is more beneficial to further improving the electronic conduction capability of the solid-state battery 5, which is specifically reflected by an improvement in the discharge capacity and energy density of the solid-state battery 5. Optionally, $1.1 \le R_P/R_S \le 8$ may be controlled. Further optionally, $1.2 \le R_P/R_S \le 5$.

In addition, in order to reduce transmission resistance for lithium ions in the polymer electrolyte layer 53 and increase the rapid transmission speed of lithium ions, a lithium ion conductivity of the polymer electrolyte layer 53 in this disclosure at 70° C. is 0.01 mS/cm-100 mS/cm. Optionally, 0.1 mS/cm-10 mS/cm. When the lithium ion conductivity of the polymer electrolyte layer 53 at 70° C. is within the above range, the solid-state battery 5 can not only have good overall performance, but also better meet the demand for quick charging.

In the polymer electrolyte layer 53 provided in this disclosure, a mass percentage of polymer is 30%-90%. In addition, the polymer electrolyte layer 53 further includes a lithium salt and an inorganic filler, in addition to the polymer. The lithium salt is selected from at least one of lithium bis(trifluoromethanesulphonyl)imide (LiTFSI), lithium bis(fluorosulfonyl)imide (LiFSI), lithium hexafluorophosphate ($LiPF_6$), and lithium perchlorate ($LiClO_4$), and a mass percentage of the lithium salt in the polymer electrolyte layer 53 is 5%-50%. The inorganic filler is selected from at least one of $Al_2O_3$, $TiO_2$, $Li_{1+x}Al_xTi_{2-x}(PO_4)_3$ ($0<x<0.5$), $Li_{3y}La_{(2/3-y)}TiO_3$ ($0<y<0.16$), and $Li_7La_3Zr_2O_{12}$, and a mass percentage of the inorganic filler in the polymer electrolyte layer 53 is 1%-50%.

It can be understood that the lithium ion conductivity of polymers is generally low, and when the mass percentage of polymer in the polymer electrolyte layer 53 being within the above range not only helps ensure that the polymer electrolyte layer 53 has a high ion conductivity, but also enhances mechanical properties of the polymer electrolyte layer 53 and improves the interfacial infiltration. Therefore, the cycle life of the solid-state battery 5 can be further increased. Optionally, the mass percentage of polymer in the polymer electrolyte layer 53 is 50%-80%. As a match, the mass percentage of the lithium salt in the polymer electrolyte layer 53 is 10%-30%, and the mass percentage of the inorganic filler in the polymer electrolyte layer 53 is 5%-20%.

Certainly, types and amounts of the polymer, lithium salt, and inorganic filler in the polymer electrolyte layer 53 and types of a positive-electrode active material and a negative-electrode active material in the solid-state battery 5 all influence final performance of the solid-state battery 5. Therefore, generally speaking, for the above different polymers, lithium salts, inorganic fillers, positive-electrode active materials, and negative-electrode active materials, if their respective amounts are adjusted within the above ranges, the solid-state battery 5 can substantially reach best performance.

In one embodiment, the solid-state battery 5 of this disclosure further includes a positive electrode 51 and a negative electrode 54 in addition to the solid-state electrolyte. At least one polymer electrolyte layer 53 of this disclosure is provided on one surface of the sulfide electrolyte layer 52, which may be a surface of the sulfide electrolyte layer 52 facing toward the positive electrode 51 or a surface of the sulfide electrolyte layer 52 facing toward the negative electrode 54, or the polymer electrolyte layer 53 is provided on both of the two surfaces. It should be noted that, when the polymer electrolyte layer 53 is provided on both sides of the sulfide electrolyte layer 52, thicknesses of the two polymer electrolyte layers 53 need to satisfy the above formula respectively and the two thicknesses may be equal or unequal. Preferably, a thickness of a polymer electrolyte layer 53 facing toward the negative electrode 54 is larger than that of a polymer electrolyte layer 53 facing toward the positive electrode 51.

FIG. 1 is a schematic diagram of an internal structure of an example of a solid-state battery according to this disclosure. In this example, the solid-state battery 5 includes a positive electrode 51, a sulfide electrolyte layer 52, a polymer electrolyte layer 53, and a negative electrode 54 from bottom up. In a case that only one polymer electrolyte layer 53 is provided on one surface of the sulfide electrolyte layer 52 in a solid-state electrolyte 5, based on the principle of maximizing beneficial effects, in this disclosure, the polymer electrolyte layer 53 is preferably provided on a surface of the sulfide electrolyte layer 52 facing toward the negative electrode 54. This is because lithium ions are easy to reduce at the negative electrode 54, and therefore the polymer electrolyte layer 53 disposed between the sulfide electrolyte layer 52 and the negative electrode 54 can enhance interfacial contact between the sulfide electrolyte layer 52 and the negative electrode 54, avoiding production of lithium dendrites or even short circuit of the battery caused by excessively large transmission resistance for lithium ions due to direct contact between the sulfide electrolyte layer 52 with a rough surface and the negative electrode 54.

Figure 2:
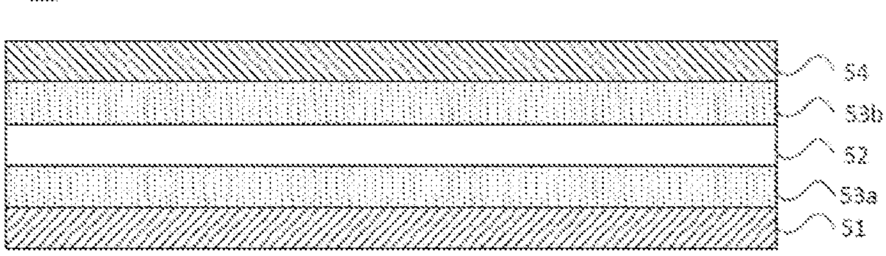
FIG. 2 is a schematic diagram of an internal structure of another example of a solid-state battery according to this disclosure.

FIG. 2 is a schematic diagram of an internal structure of another example of a solid-state battery according to this disclosure. In this example, the solid-state battery 5 includes a positive electrode 51, a first polymer electrolyte layer 53*a*, a sulfide electrolyte layer 52, a second polymer electrolyte layer 53*b*, and a negative electrode 54 from bottom up. In the solid-state battery 5, when the polymer electrolyte layer 53 is provided on both a surface of the sulfide electrolyte layer 52 facing toward the positive electrode 51 and a surface of the sulfide electrolyte layer 52 facing toward negative electrode 54, in this disclosure, the polymer electrolyte layer 53 facing toward the positive electrode 51 is called a first polymer electrolyte layer 53*a*, and the polymer electrolyte layer 53 facing toward the negative electrode 54 is called a second polymer electrolyte layer 53*b*.

In a preferred embodiment, a polymer contained in the first polymer electrolyte layer 53*a* is selected from at least one of polyvinylidene fluoride, polytetrafluoroethylene, polysiloxane, polyacrylonitrile, and a polymer contained in the second polymer electrolyte layer 53*b* is selected from at least one of polyethylene, polyethylene oxide, polyvinyl chloride, polypropylene oxide, polyisobutylene, and polyphosphoester.

Furthermore, to ensure that lithium ions normally intercalate/de-intercalate when the solid-state battery 5 is charged/discharged and to avoid oxidation and reduction of the polymers, more specifically, to allow the first polymer electrolyte layer 53*a* to have excellent oxidation resistance and the second polymer electrolyte layer 53*b* to have excellent reduction resistance, a polymer having an electrochemical oxidation peak higher than 4.5V can be selected to constitute the first polymer electrolyte layer 53*a*, and a polymer having an electrochemical reduction peak lower than 0V can be selected to constitute the second polymer electrolyte layer 53*b*.

Furthermore, a thickness Thk2 of the second polymer electrolyte layer 53*b* is greater than or equal to a thickness Thk1 of the first polymer electrolyte layer 53*a*. In this disclosure, the second polymer electrolyte layer 53*b* is located between the sulfide electrolyte layer 52 and the negative electrode 54. In a battery cycling process, a volume change of the negative electrode 54 due to reduction deposition of lithium ions is greater than that of the positive electrode caused by deintercalation of lithium ions, and thus the second polymer electrolyte layer 53*b* having a greater thickness can effectively alleviate a stress difference caused by the volume change of the negative electrode 54, which in turn maintains good interfacial contact and improve overall performance of the battery.

The positive electrode 51 and the negative electrode 54 provided in this disclosure may be electrodes commonly used in the art.

For example, the positive electrode 51 may include a positive-electrode current collector and a positive-electrode membrane that is provided on at least one surface of the positive-electrode current collector and that includes a positive-electrode active material, the positive-electrode active material may be selected from lithium cobalt oxide, lithium nickel oxide, lithium manganese oxide, lithium nickel manganese oxide, lithium nickel cobalt manganese oxide, lithium nickel cobalt aluminum oxide, lithium-containing phosphate with olivine-type structure, and the like. However, this disclosure is not limited to these materials, and other conventional well-known materials that can be used as positive-electrode active materials for lithium-ion batteries can also be used. These positive-electrode active materials can be used alone or in a combination of two or more.

Optionally, the positive-electrode active material may be selected from one or more of $LiCoO_2$, $LiNiO_2$, $LiMnO_2$, $LiMn_2O_4$, $LiFePO_4$, $LiMnPO_4$, and $Li_zNi_xCo_yMe_{(1-x-y)}O_2$, where 0<x<1, 0<y<1, 0<(1−x−y)<1, and z≥0.95, and Me is selected from one or more of Mn, Al, Mg, Zn, Ga, Ba, Fe, Cr, Sn, V, Sc, Ti, and Zr.

Further, in some embodiments, the positive-electrode active material may be selected from one or more of $Li_zNi_xCo_yMe_{(1-x-y)}O_2$, where 0.5<x<1, 0<y<1, 0<(1−x−y)<1, and z≥0.95, and Me is selected from one or more of Mn, Al, Mg, Zn, Ga, Ba, Fe, Cr, Sn, V, Sc, Ti, and Zr.

In addition, the positive-electrode membrane may also include a conductive agent and a binder, types of which are not specifically limited and can be selected as needed.

The negative electrode 54 may include a negative-electrode current collector and a negative-electrode membrane that is provided on at least one surface of the negative-electrode current collector and that includes a negative-electrode active material; and the negative-electrode active material may be selected from one or more of carbon materials, silicon-based materials, tin-based materials, and lithium titanate. The carbon material may be selected from one or more of graphite, soft carbon, hard carbon, carbon fiber, and carbonaceous mesophase spherule; the graphite may be selected from one or more of artificial graphite and natural graphite; the silicon-based material may be selected from one or more of elemental silicon, silicon-oxygen compounds, silicon-carbon composites, and silicon alloys; and the tin-based material may be selected from one or more of elemental tin, tin-oxygen compounds, and tin alloys. More optionally, the negative-electrode active material may be selected from one or more of carbon materials and silicon-based materials.

In addition, the negative-electrode membrane may also include a conductive agent and a binder, types of which are not specifically limited and can be selected as needed.

It should also be noted that the preparation method of the solid-state battery 5 of this disclosure is compatible with the existing preparation method of a solid-state battery 5 containing a sulfide electrolyte layer 52. After a target thickness of the polymer electrolyte layer 53 is determined based on thickness and packing fraction of a pressurized sulfide electrolyte layer 52, the polymer electrolyte layer 53 having the target thickness is pressed; finally, the polymer electrolyte layer 53 and the sulfide electrolyte layer 52 are combined through bonding or low-pressure pressing (less than 5 MPa) to obtain the solid-state electrolyte of this disclosure. Subsequently, the positive electrode 51, the solid-state electrolyte and the negative electrode 54 are assembled to obtain the solid-state battery 5 of this disclosure.

Figure 3:
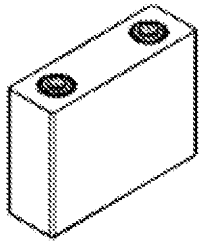
FIG. 3 is a schematic diagram of an external structure of a solid-state battery.

This disclosure does not impose any special limitations on the shape of the solid-state battery 5, and the battery may be rectangular, or of any other shapes. FIG. 3 is a schematic diagram of an external structure of a solid-state battery. FIG. 3 shows a solid-state battery 5 of a rectangular structure as an example.

In some examples, the solid-state battery 5 may include an outer package. The outer package may be used for packaging the positive electrode 51, the negative electrode 54, and the solid-state electrolyte.

In some examples, the outer package of the solid-state battery 5 may alternatively be a soft pack, for example, a soft pouch. A material of the soft pack may be plastic, for example, one or more of polypropylene (PP), polybutylene terephthalate (PBT), polybutylene succinate (PBS), and the like. The outer package of the solid-state battery 5 may be a hard shell, for example, a hard plastic shell, an aluminum shell, or a steel shell.

A second aspect of this disclosure provides a battery module 4, and the battery module 4 includes the solid-state battery 5 provided in the first aspect.

In some examples, solid-state batteries 5 may be assembled into the battery module 4. The battery module 4 may include a plurality of solid-state batteries 5 whose quantity may be adjusted according to the use case and capacity of the battery module 4.

Figure 4:
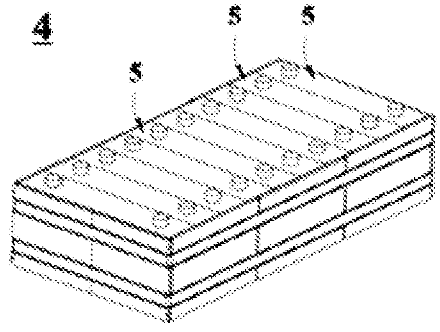
FIG. 4 is a schematic diagram of an embodiment of a battery module.

FIG. 4 is a schematic diagram of an embodiment of a battery module 4. Referring to FIG. 4, in the battery module 4, a plurality of solid-state batteries 5 may be sequentially arranged in a length direction of the battery module 4. Certainly, the solid-state batteries may alternatively be arranged in any other manner. Further, the plurality of solid-state batteries 5 may be fastened by fasteners.

In some embodiments, the battery module 4 may further include a housing with an accommodating space, and the plurality of solid-state batteries 5 are accommodated in the accommodating space.

In this disclosure, the solid-state electrolyte of the solid-state battery 5 includes a sulfide electrolyte layer 53 and a polymer electrolyte layer 53. Thickness of the polymer electrolyte layer 53 is determined based on thickness and packing fraction of the sulfide electrolyte layer 52, and thus the polymer electrolyte layer 53 and the sulfide electrolyte layer 52 are highly matched. In this disclosure, a solid-state electrolyte satisfying the above conditions is used, which can not only overcome poor interfacial infiltration between the sulfide electrolyte layer 52 and the electrode and elevate interface transmission resistance for lithium ions, but also effectively alleviate the cracking proneness of the sulfide electrolyte layer 52 and reduce the probability of short circuit of the solid-state battery. In addition, the polymer electrolyte layer 53 does not significantly reduce the energy density of the battery, thereby ensuring that power energy of the solid-state battery is effectively released.

A third aspect of this disclosure provides a battery pack 1, and the battery pack 1 includes the solid-state battery 5 provided in the first aspect or a battery module 4.

In some examples, the battery pack 1 may be directly formed by a plurality of solid-state batteries 5; alternatively, the battery pack 4 may be formed by connecting in series or in parallel two or more battery modules 4 each including a plurality of solid-state batteries 5. The quantity of solid-state batteries 5 may be adjusted based on use and capacity of the battery pack 1.

Figure 5:
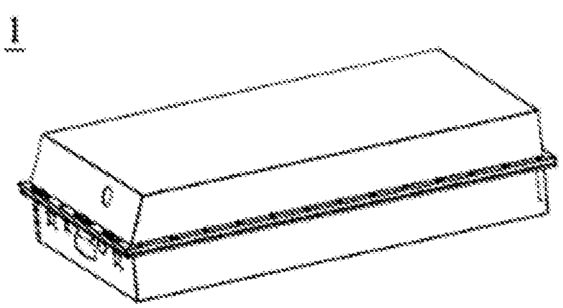
FIG. 5 is a schematic diagram of an embodiment of a battery pack.
Figure 6:
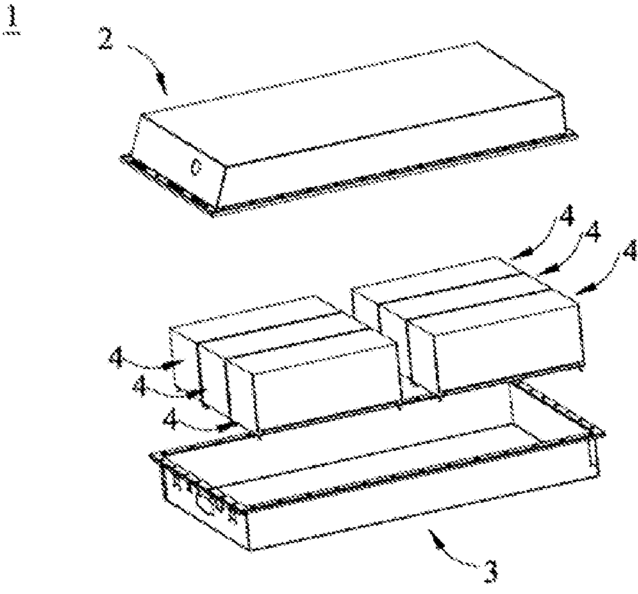
FIG. 6 is an exploded view of FIG. 5.

FIG. 5 is a schematic diagram of an embodiment of a battery pack 1, and FIG. 6 is an exploded view of FIG. 5. Referring to FIG. 5 and FIG. 6, the battery pack 1 may include a battery box and a plurality of battery modules 4 arranged in the battery box, and each battery module 4 includes a plurality of solid-state batteries 5. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

It can be understood that, because the battery pack 1 of this disclosure includes the solid-state battery 5 of this disclosure, the battery pack 1 has excellent energy density, cycling performance, and safety performance.

A fourth aspect of this disclosure further provides an apparatus, and the apparatus includes the solid-state battery 5 provided in the first aspect of this disclosure, or the battery module 4 provided in the second aspect, or the battery pack 1 provided in the third aspect. The solid-state battery 5, the battery module 4 or the battery pack 1 may be used as a power source for the apparatus, or serve as an energy storage unit for the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A solid-state battery 5, a battery module 4, or a battery pack 1 may be selected for the apparatus according to requirements for using the apparatus.

Figure 7:
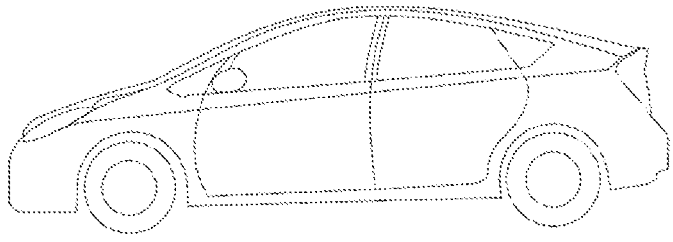
FIG. 7 is a schematic diagram of an embodiment of a solid-state battery used as a power apparatus.

FIG. 7 is a schematic diagram of an embodiment of a solid-state battery of this disclosure used as a power source. The apparatus is a battery electric vehicle, a hybrid electric vehicle, a plug-in hybrid electric vehicle, or the like. To meet requirements of the apparatus for high power and high energy density of the power source, a battery pack 1 or a battery module 4 may be used.

In another example, the apparatus may be a mobile phone, a tablet computer, a notebook computer, or the like. Such apparatus is usually required to be light and thin, for which the solid-state battery 5 may be used as a power source.

The apparatus provided in this disclosure includes the foregoing solid-state battery 5, battery module 4 or battery pack 1, and therefore has excellent endurance, service life and safety performance.

This disclosure is further described with reference to examples. It should be understood that these examples are merely used to describe this disclosure but not to limit the scope of this disclosure. In the following examples, unless otherwise stated, raw materials used are all commercially available.

Lithium-ion batteries in Examples 1-14 and Comparative Examples 1-12 were prepared according to the following methods.

(1) Preparation of Positive Electrode 51

A positive-electrode active material $LiNi_{1/3}Co_{1/3}Mn_{1/3}O_2$, an electrolyte material $Li_6PS_5Cl$, a conductive agent Super-P, and a styrene-butadiene rubber (SBR) as a binder were mixed in a mass ratio of 70:24:3:3, with toluene added as a solvent. The mixture was stirred under the action of a vacuum stirrer to a uniform system to obtain a positive-electrode slurry. The positive-electrode slurry was uniformly applied to two surfaces of a current collector aluminum foil, dried at room temperature, and transferred to an oven for drying, followed by cold pressing and slitting, to obtain a positive electrode 51.

(2) Preparation of Negative Electrode 54

Lithium foils were attached to two surfaces of a current collector copper foil by rolling, followed by slitting, to obtain a negative electrode 54.

(3) Preparation of Solid-State Electrolyte a. Preparation of Sulfide Electrolyte Layer 52

A sulfide electrolyte material and styrene-butadiene rubber (SBR) as a binder were mixed in a mass ratio of 97:3, with toluene added as a solvent. The mixture was stirred under the action of a vacuum stirrer to a uniform system to obtain a sulfide electrolyte slurry. The sulfide electrolyte slurry was uniformly applied to two surfaces of a matrix, dried at room temperature, and transferred to an oven for drying, followed by cold pressing at 300 MPa, decoating, and slitting, to obtain a sulfide electrolyte layer 52.

Figure 8:
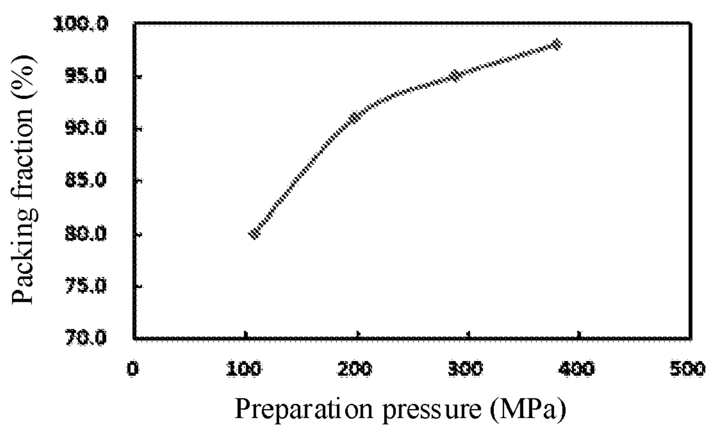
FIG. 8 is a curve chart illustrating relationship between packing fraction of a sulfide electrolyte layer and preparation pressure.
Figure 9:
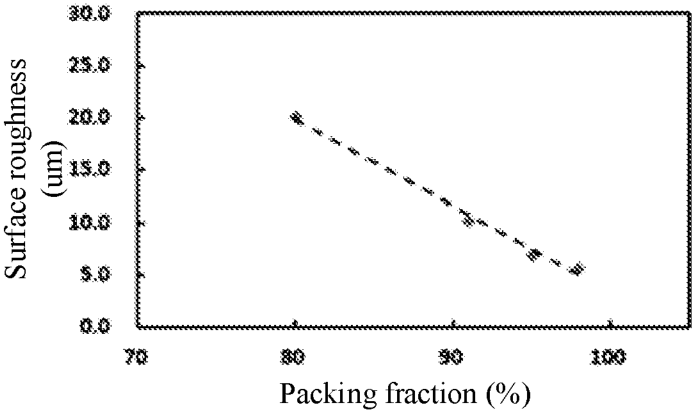
FIG. 9 is a curve chart illustrating relationship between surface roughness and packing fraction of a sulfide electrolyte layer.

FIG. 8 is a curve chart illustrating relationship between packing fraction of the sulfide electrolyte layer 52 and preparation pressure, and FIG. 9 is a curve chart illustrating relationship between surface roughness and packing fraction of the sulfide electrolyte layer 52. According to FIG. 8 and FIG. 9, the packing fraction of the sulfide electrolyte layer 52 gradually rises with increasing of the preparation pressure; and a higher packing fraction of the sulfide electrolyte layer 52 means a lower surface roughness thereof.

Compositions, thicknesses, and other parameters of the sulfide electrolyte layers 52 provided in all examples are given in Table 1.

b. Preparation of Polymer Electrolyte Layer 53

A polymer, a lithium salt, and an inorganic filler were mixed in a mass ratio of (90−y):y:10 (0≤y≤50), with acetonitrile added as a solvent. The mixture was stirred under the action of a vacuum stirrer to a uniform system to obtain a polymer electrolyte layer slurry. The polymer electrolyte layer slurry was uniformly applied to the surface of a matrix, dried at room temperature, transferred to an oven for drying, followed by cold pressing and slitting to obtain a polymer electrolyte layer 53.

Compositions, thicknesses, and other parameters of the polymer electrolyte layers 53 provided in all examples are given in Table 1.

(4) Preparation of Solid-State Battery

The positive electrode 51, the polymer electrolyte layer 53, the sulfide electrolyte layer 52, and the negative electrode 54 prepared by the above preparation methods were sequentially stacked as required. The stack was hot pressed at 70° C. and 5 MPa, to prepare the solid-state batteries of the examples and the comparative examples.

TABLE 1

| Sample | Solid-state electrolyte | Type of polymer | Thickness (μm) | Polymer oxidation potential (V) | Polymer reduction potential (V) | Polymer content (wt %) | Lithium salt content (wt %) | Packing fraction of sulfide electrolyte (%) | Lithium ion conductivity (mS/cm) | Ratio of surface resistance (Rp/Rs) |
|---|---|---|---|---|---|---|---|---|---|---|
| Example 1 | First polymer electrolyte layer | Polyvinylidene fluoride | 30 | >4.5 | / | 70 | 20 | / | 0.2 | 4.6 |
| | Sulfide electrolyte layer | $Li_6PS_5Cl$ | 30 | / | / | / | / | 80 | 1.1 | / |
| | Second polymer electrolyte layer | Polyoxyethylene | 30 | / | <0 | 70 | 20 | / | 0.5 | 1.5 |
| Example 2 | First polymer electrolyte layer | Polyvinylidene fluoride | 20 | >4.5 | / | 70 | 20 | / | 0.2 | 4.8 |
| | Sulfide electrolyte layer | $Li_6PS_5Cl$ | 30 | / | / | / | / | 92 | 1.6 | / |
| | Second polymer electrolyte layer | Polyoxyethylene | 20 | / | <0 | 70 | 20 | / | 0.5 | 2.1 |
| Example 3 | First polymer electrolyte layer | Polyvinylidene fluoride | 30 | >4.5 | / | 70 | 20 | / | 0.2 | 7.1 |
| | Sulfide electrolyte layer | $Li_6PS_5Cl$ | 30 | / | / | / | / | 92 | 1.6 | / |
| | Second polymer electrolyte layer | Polyoxyethylene | 30 | / | <0 | 70 | 20 | / | 0.5 | 3.2 |
| Example 4 | First polymer electrolyte layer | Polyvinylidene fluoride | 10 | >4.5 | / | 70 | 20 | / | 0.2 | 3 |
| | Sulfide electrolyte layer | $Li_6PS_5Cl$ | 30 | / | / | / | / | 98 | 1.8 | / |
| | Second polymer electrolyte layer | Polyoxyethylene | 10 | / | <0 | 70 | 20 | / | 0.5 | 1.2 |
| Example 5 | First polymer electrolyte layer | Polyvinylidene fluoride | 30 | >4.5 | / | 70 | 20 | / | 0.2 | 6.2 |
| | Sulfide electrolyte layer | $Li_6PS_5Cl$ | 30 | / | / | / | / | 98 | 1.8 | / |
| | Second polymer electrolyte layer | Polyoxyethylene | 30 | / | <0 | 70 | 20 | / | 0.5 | 2.7 |

TABLE 1-continued

| Sample | Solid-state electrolyte | Type of polymer | Thickness (μm) | Polymer oxidation potential (V) | Polymer reduction potential (V) | Polymer content (wt %) | Lithium salt content (wt %) | Packing fraction of sulfide electrolyte (%) | Lithium ion conductivity (mS/cm) | Ratio of surface resistance (Rp/Rs) |
|---|---|---|---|---|---|---|---|---|---|---|
| Example 6 | First polymer electrolyte layer | Polyoxyethylene | 10 | 3.8 | / | 70 | 20 | / | 0.5 | 1.3 |
| | Sulfide electrolyte layer | $Li_6PS_5Cl$ | 30 | / | / | / | / | 98 | 1.8 | / |
| | Second polymer electrolyte layer | Polyoxyethylene | 10 | / | <0 | 70 | 20 | / | 0.5 | 1.3 |
| Example 7 | First polymer electrolyte layer | Polyvinylidene fluoride | 10 | >4.5 | / | 70 | 20 | / | 0.2 | 3.2 |
| | Sulfide electrolyte layer | $Li_6PS_5Cl$ | 30 | / | / | / | / | 98 | 1.8 | / |
| | Second polymer electrolyte layer | Polyacrylonitrile | 10 | / | 0.3 | 70 | 20 | / | 0.4 | 1.5 |
| Example 8 | First polymer electrolyte layer | Polyvinylidene fluoride | 10 | >4.5 | / | 90 | 5 | / | 0.05 | 9.8 |
| | Sulfide electrolyte layer | $Li_6PS_5Cl$ | 30 | / | / | / | / | 98 | 1.8 | / |
| | Second polymer electrolyte layer | Polyoxyethylene | 10 | / | <0 | 90 | 5 | / | 0.07 | 7.6 |
| Example 9 | First polymer electrolyte layer | Polyvinylidene fluoride | 10 | >4.5 | / | 50 | 30 | / | 0.3 | 2.4 |
| | Sulfide electrolyte | $Li_6PS_5Cl$ | 30 | / | / | / | / | 98 | 1.8 | / |
| | Second polymer electrolyte layer | Polyoxyethylene | 10 | / | <0 | 50 | 30 | / | 0.6 | 1.3 |
| Example 10 | First polymer electrolyte layer | Polyvinylidene fluoride | 10 | >4.5 | / | 30 | 50 | / | 0.5 | 1.7 |
| | Sulfide electrolyte layer | $Li_6PS_5Cl$ | 30 | / | / | / | / | 98 | 1.8 | / |
| | Second polymer electrolyte layer | Polyoxyethylene | 10 | / | <0 | 30 | 50 | / | 0.7 | 1.3 |
| Example 11 | First polymer electrolyte layer | Polyvinylidene fluoride | 10 | >4.5 | / | 70 | 20 | / | 0.2 | 9 |
| | Sulfide electrolyte layer | $Li_6PS_5Cl$ | 10 | / | / | / | / | 98 | 1.8 | / |
| | Second polymer electrolyte layer | Polyoxyethylene | 10 | / | <0 | 70 | 20 | / | 0.5 | 3.6 |
| Example 12 | First polymer electrolyte layer | Polyvinylidene fluoride | 10 | >4.5 | / | 70 | 20 | / | 0.2 | 3.4 |
| | Sulfide electrolyte layer | $Li_6PS_5Cl$ | 50 | / | / | / | / | 98 | 1.8 | / |
| | Second polymer electrolyte layer | Polyoxyethylene | 10 | / | <0 | 70 | 20 | / | 0.5 | 1.8 |
| Example 13 | First polymer electrolyte layer | Polyvinylidene fluoride | 10 | >4.5 | / | 70 | 20 | / | 0.2 | 2.1 |
| | Sulfide electrolyte | $Li_6PS_5Cl$ | 100 | / | / | / | / | 98 | 1.8 | / |

TABLE 1-continued

| Sample | Solid-state electrolyte | Type of polymer | Thickness (μm) | Polymer oxidation potential (V) | Polymer reduction potential (V) | Polymer content (wt %) | Lithium salt content (wt %) | Packing fraction of sulfide electrolyte (%) | Lithium ion conductivity (mS/cm) | Ratio of surface resistance (Rp/Rs) |
|---|---|---|---|---|---|---|---|---|---|---|
| | layer | | | | | | | | | |
| | Second polymer electrolyte layer | Polyoxyethylene | 10 | / | <0 | 70 | 20 | / | 0.5 | 1.1 |
| Example 14 | First polymer electrolyte layer | / | / | / | / | / | / | / | / | / |
| | Sulfide electrolyte layer | $Li_6PS_5Cl$ | 30 | / | / | / | / | 98 | 1.8 | / |
| | Second polymer electrolyte layer | Polyoxyethylene | 10 | / | <0 | 70 | 20 | / | 0.5 | 1.2 |
| Comparative Example 1 | First polymer electrolyte layer | / | / | / | / | / | / | / | 1.1 | / |
| | Sulfide electrolyte layer | $Li_6PS_5Cl$ | 30 | / | / | / | / | 80 | | |
| | Second polymer electrolyte layer | / | / | / | / | / | / | / | | |
| Comparative Example 2 | First polymer electrolyte layer | / | / | / | / | / | / | / | 1.6 | / |
| | Sulfide electrolyte layer | $Li_6PS_5Cl$ | 30 | / | / | / | / | 92 | | |
| | Second polymer electrolyte layer | / | / | / | / | / | / | / | | |
| Comparative Example 3 | First polymer electrolyte layer | / | / | / | / | / | / | / | 1.8 | / |
| | Sulfide electrolyte layer | $Li_6PS_5Cl$ | 30 | / | / | / | / | 98 | | |
| | Second polymer electrolyte layer | / | / | / | / | / | / | / | | |
| Comparative Example 4 | First polymer electrolyte layer | / | / | / | / | / | / | / | 1.8 | / |
| | Sulfide electrolyte layer | $Li_6PS_5Cl$ | 10 | / | / | / | / | 98 | | |
| | Second polymer electrolyte layer | / | / | / | / | / | / | / | | |
| Comparative Example 5 | First polymer electrolyte layer | / | / | / | / | / | / | / | 1.8 | / |
| | Sulfide electrolyte layer | $Li_6PS_5Cl$ | 100 | / | / | / | / | 98 | | |
| | Second polymer electrolyte layer | / | / | / | / | / | / | / | | |
| Comparative Example 6 | First polymer electrolyte layer | Polyvinylidene fluoride | 10 | >4.5 | / | 70 | 20 | / | 0.2 | 1.8 |
| | Sulfide electrolyte layer | $Li_6PS_5Cl$ | 30 | / | / | / | / | 80 | 1.1 | / |

TABLE 1-continued

| Sample | Solid-state electrolyte | Type of polymer | Thickness (μm) | Polymer oxidation potential (V) | Polymer reduction potential (V) | Polymer content (wt %) | Lithium salt content (wt %) | Packing fraction of sulfide electrolyte (%) | Lithium ion conductivity (mS/cm) | Ratio of surface resistance (Rp/Rs) |
|---|---|---|---|---|---|---|---|---|---|---|
| | Second polymer electrolyte layer | Polyoxyethylene | 10 | / | <0 | 70 | 20 | / | 0.5 | 0.5 |
| Comparative Example 7 | First polymer electrolyte layer | Polyvinylidene fluoride | 20 | >4.5 | / | 70 | 20 | / | 0.2 | 3.1 |
| | Sulfide electrolyte layer | $Li_6PS_5Cl$ | 30 | / | / | / | / | 80 | 1.1 | / |
| | Second polymer electrolyte layer | Polyoxyethylene | 20 | / | <0 | 70 | 20 | / | 0.5 | 0.9 |
| Comparative Example 8 | First polymer electrolyte layer | Polyvinylidene fluoride | 50 | >4.5 | / | 70 | 20 | / | 0.2 | 9.1 |
| | Sulfide electrolyte layer | $Li_6PS_5Cl$ | 30 | / | / | / | / | 80 | 1.1 | / |
| | Second polymer electrolyte layer | Polyoxyethylene | 50 | / | <0 | 70 | 20 | / | 0.5 | 3.7 |
| Comparative Example 9 | First polymer electrolyte layer | Polyvinylidene fluoride | 10 | >4.5 | / | 70 | 20 | / | 0.2 | 2.6 |
| | Sulfide electrolyte layer | $Li_6PS_5Cl$ | 30 | / | / | / | / | 92 | 1.6 | / |
| | Second polymer electrolyte layer | Polyoxyethylene | 10 | / | <0 | 70 | 20 | / | 0.5 | 0.9 |
| Comparative Example 10 | First polymer electrolyte layer | Polyvinylidene fluoride | 10 | >4.5 | / | 70 | 20 | / | 0.2 | 3 |
| | Sulfide electrolyte layer | $Li_6PS_5Cl$ | 30 | / | / | / | / | 98 | 1.8 | / |
| | Second polymer electrolyte layer | Polyoxyethylene | 10 | / | <0 | 70 | 20 | / | 0.5 | 1.2 |
| Comparative Example 11 | First polymer electrolyte layer | Polyvinylidene fluoride | 5 | >4.5 | / | 70 | 20 | / | 0.2 | 1.5 |
| | Sulfide electrolyte layer | $Li_6PS_5Cl$ | 30 | / | / | / | / | 98 | 1.8 | / |
| | Second polymer electrolyte layer | Polyoxyethylene | 5 | / | <0 | 70 | 20 | / | 0.5 | 0.6 |
| Comparative Example 12 | First polymer electrolyte layer | Polyvinylidene fluoride | 50 | >4.5 | / | 70 | 20 | / | 0.2 | 9.8 |
| | Sulfide electrolyte layer | $Li_6PS_5Cl$ | 30 | / | / | / | / | 98 | 1.8 | / |
| | Second polymer electrolyte layer | Polyoxyethylene | 50 | / | <0 | 70 | 20 | / | 0.5 | 6.5 |

The parameters in Table 1 were tested in the following methods.

1. Thicknesses of Functional Layers

The thicknesses of the first polymer electrolyte layer 53*a*, sulfide electrolyte layer 52, and second polymer electrolyte layer 53*b* were measured by a micrometer.

2. Polymer Oxidation Potential and Polymer Reduction Potential

A polymer electrolyte layer 53 was punched into a wafer, with lithium sheet attached to one side and a stainless steel sheet attached to the other side. Cyclic voltammetry test was carried out using Chenhua electrochemical workstation, with a scanning voltage in the range of 0V-4.5V and a scanning rate of 1 mV/s, and the polymer oxidation potential (vs $Li^+/Li$) could be obtained based on a peak of cyclic voltammetry curve.

3. Packing Fraction of Sulfide Electrolyte Layer 52

A sulfide electrolyte was pressed into a wafer-shaped sulfide electrolyte layer 52 under 300 MPa pressure, and porosity w of the sulfide electrolyte layer 52 was measured with a true density analyzer, and then a packing fraction thereof was (1−w).

4. Lithium Ion Conductivity at 70° C.

a. Test of lithium ion conductivity of sulfide electrolyte layer 52 at 70° C.: a sulfide electrolyte was pressed into a wafer-shaped sulfide electrolyte layer 52 under 300 MPa pressure, and a stainless steel sheet was used as a current collector on both sides of the sulfide electrolyte layer; ohmic resistance of the sulfide electrolyte layer 52 was measured by Chenhua electrochemical workstation. With a test temperature of 70° C., a frequency range of 1 Hz-1 MHz, and a perturbation signal of 5 mV, the lithium ion conductivity of the sulfide electrolyte layer 52 at 70° C. could be calculated based on the resistance, thickness, and area of the sulfide electrolyte layer 52.

b. Test of lithium ion conductivity of polymer electrolyte layer 53 at 70° C.: a polymer solid-state electrolyte layer was placed between two stainless steel current collectors, and pressed to fit under 5 MPa pressure; ohmic resistance of the polymer electrolyte layer 53 was measured by Chenhua electrochemical workstation. With the same parameters as in a, a total ion conductivity of the polymer electrolyte layer 53 at 70° C. could be calculated based on the resistance, thickness, and area of the polymer electrolyte layer 53. In addition, a stainless steel current collector was provided on one side of the polymer electrolyte, and a lithium foil as a current collector was provided on the other side thereof; a direct-current polarization test was conducted at a polarization voltage of 100 mV, and a change of current after polarization with respect to the current before polarization was measured to calculate the number of migrated lithium ions in the polymer electrolyte layer. The obtained total ion conductivity of the polymer electrolyte layer 53 was multiplied by the number of migrated lithium ions in the polymer electrolyte layer, to obtain the lithium ion conductivity of the polymer electrolyte layer 53 at 70° C.

5. Surface Resistance

Similar to the test of lithium ion conductivity, a sulfide electrolyte and a polymer electrolyte were separated pressed to form a sulfide electrolyte layer 52 and a polymer electrolyte layer 53. For both electrolyte layers, a stainless steel sheet was provided on both sides to serve as current collectors. Resistances of the sulfide electrolyte layer 52 and the polymer electrolyte layer 53 were measured. A ratio of a surface resistance $R_P$ of the polymer electrolyte layer 53 to a surface resistance $R_S$ of the sulfide electrolyte layer 52 could be obtained based on areas of the sulfide electrolyte layer 52 and the polymer electrolyte layer 53.

Test Cases

The following parameters were tested for the solid-state batteries 5 in the examples and the comparative examples, with test results given in Table 2.

1. Maximum Number of Cycles

For batteries, the maximum number of cycles may have two cases. In one case, it is the number of cycles where short circuit occurs in the battery (voltage down to <2V). In the other case, it is the number of cycles where a cycling discharge capacity of the battery drops to below 60% of the first-cycle discharge capacity. The number of cycles where the battery first reaches either of the states is considered as its maximum number of cycles. The test was conducted under a test temperature of 70° C., a charge/discharge rate of 0.1 C, and a cutoff voltage of 2.8V-4.2V.

2. Capacity after 100 Cycles

Discharge capacities of the battery in a charge and discharge cycling process were measured by a LAND tester, and a discharge capacity after 100 cycles was recorded, where the test temperature was 70° C., the charge/discharge rate was 0.1 C, and the cutoff voltage was 2.8V-4.2V.

3. Energy Density

The energy density was calculated based on the capacity, voltage platform, and mass of the solid-state battery 5 (only its cathode, electrode and anode considered).

TABLE 2

| | Maximum number of cycles | Capacity after 100 cycles (mAh/g) | Energy density (Wh/kg) |
|---|---|---|---|
| Example 1 | 125 | 132 | 253 |
| Example 2 | 475 | 144 | 286 |
| Example 3 | 548 | 141 | 265 |
| Example 4 | 766 | 149 | 301 |
| Example 5 | 785 | 144 | 270 |
| Example 6 | 473 | 111 | 234 |
| Example 7 | 344 | 99 | 244 |
| Example 8 | 625 | 110 | 233 |
| Example 9 | 748 | 144 | 297 |
| Example 10 | 428 | 130 | 274 |
| Example 11 | 563 | 144 | 316 |
| Example 12 | 796 | 147 | 269 |
| Example 13 | 884 | 146 | 237 |
| Example 14 | 530 | 122 | 320 |
| Comparative Example 1 | 3 | Short circuit | 308 |
| Comparative Example 2 | 15 | Short circuit | 316 |
| Comparative Example 3 | 28 | Short circuit | 323 |
| Comparative Example 4 | 17 | Short circuit | 351 |
| Comparative Example 5 | 280 | 145 | 249 |
| Comparative Example 6 | 19 | Short circuit | 295 |
| Comparative Example 7 | 33 | Short circuit | 273 |
| Comparative Example 8 | 142 | 126 | 188 |
| Comparative Example 9 | 82 | Short circuit | 300 |
| Comparative Example 10 | 572 | 131 | 205 |
| Comparative Example 11 | 90 | Short circuit | 314 |
| Comparative Example 12 | 812 | 136 | 217 |

It can be Learned from Table 2 that:

1. According to Comparative Examples 1-5, when the solid-state electrolyte consisted of only a sulfide electrolyte layer 52, short circuit occurred in all Comparative Examples 1-4. The reason is that the sulfide electrolyte layer 52 in Comparative Example 1 has a low packing fraction, a porous interior, and a rough surface such that lithium ions are subjected to a large transmission resistance in the sulfide electrolyte layer 52, and an uneven flow of lithium ions are transmitted on the surface, making lithium dendrites easy to produce which cause short circuit in the batteries. In Comparative Examples 2-4, although a packing fraction of the sulfide electrolyte layer 52 is increased, a surface of the sulfide electrolyte layer 52 having a high packing fraction has a high hardness without the help of the polymer electrolyte layer 53, leading to poor interfacial contact between the sulfide electrolyte layer 52 and the electrode and cracking part of the sulfide electrolyte layer 52, which causes short circuit in the batteries.

Relatively speaking, in Comparative Example 5, the sulfide electrolyte layer 52 is relatively thick and can alleviate to some extent the release of stress caused by the high surface hardness of the sulfide electrolyte layer 52, so that the surface of the sulfide electrolyte layer 52 does not crack and risks of short circuit in the battery are reduced. However, the over-thick sulfide electrolyte layer 52 significantly reduces an effective capacity of the battery, and therefore the battery has a low energy density.

2. According to Example 1 and Comparative Examples 6-8, when the polymer electrolyte layer 53 satisfies the requirements of this disclosure, cycling performance and safety performance of the solid-state battery 5 can be improved, and the cycling performance, safety performance, and energy density are balanced. Similarly, this conclusion can also be reached according to Examples 2 and 3 and Comparative Examples 9 and 10, or Examples 4, 5, and 14 and Comparative Examples 11 and 12.

In addition, according to Examples 1-5 and 14, the cycling performance of the solid-state battery 5 is improved with increasing of the packing fraction of the sulfide electrolyte layer 52. Although the energy density of the battery decreases slightly with increasing of the thickness of the polymer electrolyte layer 53, the decreased energy density is still within an acceptable range. Therefore, the packing fraction of the sulfide electrolyte layer 52 and the thickness of the polymer electrolyte layer 53 can be further adjusted according to the disclosure requirements for the battery.

3. According to Examples 4, 6, and 7, a first polymer electrolyte layer 53*a* having an overly low oxidation potential or a second polymer electrolyte layer 53*b* having an overly high reduction potential causes some side reaction on an electrode-electrolyte interface, reducing the discharge capacity and energy density of the battery after cycling.

4. According to Examples 4 and 8-10, a low polymer content in the polymer electrolyte layer 53 (Example 10) leads to poor flexibility of the polymer electrolyte layer 53, making it less effective to alleviate the degradation of interfacial contact and the impact of stress change, which is therefore not conducive to improving the cycling performance of the solid-state battery 5. In addition, the corresponding increasing of lithium salt content also affects the energy density of the solid-state battery 5. A high polymer content in the polymer electrolyte layer is high (Example 8) leads to an increased ionic resistance of the polymer electrolyte layer 53, so that the discharge capacity and energy density of the solid-state battery 5 are reduced. Therefore, controlling the mass percentage of polymer in the polymer electrolyte layer 53 to be within 50%-80% is conducive to ensuring good cycling performance and high energy density of the solid-state battery 5.

In addition, a high polymer content in the polymer electrolyte layer 53 also leads to a high $R_P/R_S$, which is not conducive to optimizing the cycling performance and energy density of the battery.

5. According to Examples 4 and 11-13, although the energy density of the solid-state battery 5 tends to decrease with the increasing of thickness of the sulfide electrolyte layer 52, the performance of the sulfide electrolyte layer 52 is improved more notably, which means that the solid-state battery 5 has good cycling performance. Therefore, the thickness of the sulfide electrolyte layer may be further adjusted according to the disclosure requirements for the solid-state battery 5. Generally, the sulfide electrolyte layer 52 having a thickness of 10 μm-50 μm can ensure that the cycling performance of the solid-state battery 5 and the energy density thereof are balanced.

In conclusion, it should be noted that the above examples are merely intended for describing the technical solutions of this disclosure but not for limiting this disclosure. Although this disclosure is described in detail with reference to the foregoing examples, persons of ordinary skill in the art should understand that they may still make modifications to the technical solutions described in the foregoing examples or make equivalent replacements to some or all technical features thereof without departing from the scope of the technical solutions of the examples of this disclosure.

The invention claimed is:

1. A solid-state battery, comprising a solid-state electrolyte, wherein the solid-state electrolyte comprises a sulfide electrolyte layer and at least one polymer electrolyte layer provided on a surface of the sulfide electrolyte layer, wherein the solid-state electrolyte satisfies the following condition:

$$84.2-80.2\times w\leq Thk\leq h,$$

wherein h represents a thickness of the sulfide electrolyte layer in μm, h is from 1 μm to 250 μm, Thk is from 10 μm to 30 μm, Thk represents a thickness of the polymer electrolyte layer on one side in μm, the thickness Thk of the polymer electrolyte layer on one side and the thickness h of the sulfide electrolyte layer satisfies Thk≤0.8×h, and w represents a packing fraction of the sulfide electrolyte layer, w satisfies 0.9≤w≤0.98, wherein the solid-state battery comprises a positive electrode and a negative electrode, the solid-state electrolyte is located between the positive electrode and the negative electrode, and the at least one polymer electrolyte layer comprises a first polymer electrolyte layer and a second polymer electrolyte layer, wherein the first polymer electrolyte layer is located on a surface of the sulfide electrolyte layer facing toward the positive electrode, and the second polymer electrolyte layer is located on a surface of the sulfide electrolyte layer facing toward the negative electrode.

2. The solid-state battery according to claim 1, wherein the thickness Thk of the polymer electrolyte layer on one side and the thickness h of the sulfide electrolyte layer satisfies Thk≤0.5×h.

3. The solid-state battery according to claim 1, wherein the sulfide electrolyte layer and the polymer electrolyte layer satisfy the following relationship:

$$1\leq RP/RS\leq 10$$

wherein RS represents a surface resistance of the sulfide electrolyte layer in Ω·cm2, and RP represents a surface resistance of the polymer electrolyte layer in Ω·cm2.

4. The solid-state battery according to claim 3, wherein 1.1≤RP/RS≤8.

5. The solid-state battery according to claim 3, wherein 1.2≤RP/RS≤5.

6. The solid-state battery according to claim 1, wherein a lithium ion conductivity of the polymer electrolyte layer at 70° C. is 0.01 mS/cm-100 mS/cm.

7. The solid-state battery according to claim 1, wherein a lithium ion conductivity of the polymer electrolyte layer at 70° C. is 0.1 mS/cm-10 mS/cm.

8. The solid-state battery according to claim 1, wherein the polymer electrolyte layer contains a polymer whose mass percentage in the polymer electrolyte layer is 30%-90%.

9. The solid-state battery according to claim 1, wherein a polymer contained in the first polymer electrolyte layer is selected from at least one of polyvinylidene fluoride, polytetrafluoroethylene, polysiloxane, polyacrylonitrile, and polymethyl methacrylate; and a polymer contained in the second polymer electrolyte layer is selected from at least one of polyethylene, polyethylene oxide, polyvinyl chloride, polypropylene oxide, polyisobutylene, and polyphosphoester.

10. The solid-state battery according to claim 1, wherein an electrochemical oxidation peak of a polymer contained in the first polymer electrolyte layer is higher than 4.5V, and an electrochemical reduction peak of a polymer contained in the second polymer electrolyte layer is lower than 0V.

11. The solid-state battery according to claim 1, wherein a thickness of the first polymer electrolyte layer is denoted as Thk1, a thickness of the second polymer electrolyte layer is denoted as Thk2, and Thk2≥Thk1 is satisfied.

12. A battery module, wherein the battery module comprises the solid-state battery according to claim 1.

13. An apparatus, wherein a driving source or an energy storage unit of the apparatus is the solid-state battery according to claim 1.

14. The solid-state battery according to claim 1, wherein h is from 55 μm to 250 μm.

15. The solid-state battery according to claim 9, wherein the polymer contained in the first polymer electrolyte layer is polysiloxane, and the polymer contained in the second polymer electrolyte layer is one or more selected from polyvinyl chloride, polypropylene oxide, polyisobutylene, and polyphosphoester.

* * * * *